US010055849B2

(12) United States Patent
Sakai et al.

(10) Patent No.: US 10,055,849 B2
(45) Date of Patent: Aug. 21, 2018

(54) IMAGE MEASUREMENT DEVICE AND CONTROLLING METHOD OF THE SAME

(71) Applicant: MITUTOYO CORPORATION, Kanagawa (JP)

(72) Inventors: Hiroshi Sakai, Kanagawa (JP); Takeshi Saeki, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 85 days.

(21) Appl. No.: 15/364,543

(22) Filed: Nov. 30, 2016

(65) Prior Publication Data

US 2017/0161904 A1    Jun. 8, 2017

Related U.S. Application Data

(60) Provisional application No. 62/264,410, filed on Dec. 8, 2015.

(51) Int. Cl.
*H04N 5/247*    (2006.01)
*G06T 7/00*    (2017.01)
*G01B 11/02*    (2006.01)

(52) U.S. Cl.
CPC .......... *G06T 7/0051* (2013.01); *G01B 11/022* (2013.01); *H04N 5/247* (2013.01)

(58) Field of Classification Search
CPC ...... G06T 7/0051; H04N 5/247; G01B 11/022
See application file for complete search history.

(56) References Cited

U.S. PATENT DOCUMENTS

2005/0254063 A1\* 11/2005 Hill ..................... G01N 21/956
356/512

FOREIGN PATENT DOCUMENTS

JP         2012-112705 A      6/2012

\* cited by examiner

*Primary Examiner* — Nam Pham
(74) *Attorney, Agent, or Firm* — Greenblum & Bernstein, P.L.C.

(57) ABSTRACT

An image measurement device according to the present invention comprises: a stage on which a measurement object is mounted; an imaging device imaging the measurement object for a certain imaging range and outputting image information; a position control device that moves the imaging device to a plurality of measurement positions and scans in a scanning direction; and an arithmetic processing device that calculates a displacement of the measurement object. The imaging device is configured capable of imaging a preliminary measurement range broader than the certain imaging range. The arithmetic processing device, prior to a main measurement that measures the displacement of the measurement object at each measurement position, makes a preliminary measurement based on the image information corresponding to the preliminary measurement range, and sets a scanning range of the imaging device at each measurement position during the main measurement based on a result of this preliminary measurement.

12 Claims, 4 Drawing Sheets

IMAGE MEASUREMENT DEVICE AND CONTROLLING METHOD OF THE SAME

CROSS-REFERENCE TO RELATED APPLICATIONS

This application is based upon and claims the benefit of U.S. Provisional Patent Application No. 62/264,410, filed on Dec. 8, 2015, the entire contents of which are incorporated herein by reference.

BACKGROUND

Field

The present invention relates to an image measurement device that three-dimensionally measures a measurement object by imaging the measurement object and controlling method of the same.

Description of the Related Art

Examples of an image measurement device that three-dimensionally measures an object-to-be-measured based on image information acquired by an imaging device include a device that employs white light having a broad spectrum width, or a device that employs contrast information, and so on. Such an image measurement device scans the imaging device in a perpendicular direction to a stage to measure a three-dimensional shape of the object-to-be-measured from image information obtained at each perpendicular position. In such an image measurement device, sometimes, when, for example, a size of the object-to-be-measured does not fit in one visual field of the imaging device, a so-called stitching method in which the imaging device is moved with respect to the stage and a synthesis is performed after a measurement result at each measurement position has been obtained, is employed (refer to Japanese Unexamined Patent Application Publication No. 2012-112705).

However, in such an image measurement device, a scanning range in the perpendicular direction at each measurement position was fixed in a predetermined range, hence scanning took time and it was inefficient.

DETAILED DESCRIPTION

An image measurement device according to an embodiment of the present invention comprises: a stage on which a measurement object is mounted; an imaging device provided capable of relative movement with respect to the stage, the imaging device imaging the measurement object for a certain imaging range which is narrower than a measurement range and outputting image information; a position control device that moves the imaging device to a plurality of measurement positions in the measurement range and scans in a scanning direction perpendicular to the stage at each measurement position; and an arithmetic processing device that calculates a displacement of the measurement object in the scanning direction at each measurement position based on image information of the certain imaging range of each measurement position obtained by scanning of the imaging device. The imaging device is configured capable of imaging a preliminary measurement range which is broader than the certain imaging range. The arithmetic processing device: prior to a main measurement that measures the displacement of the measurement object in the scanning direction at each measurement position, makes a preliminary measurement that measures the displacement of the measurement object in the scanning direction at each measurement position from image information obtained by the imaging device scanning while imaging the preliminary measurement range; and sets a scanning range of the imaging device at each measurement position during the main measurement based on a result of this preliminary measurement.

Configuration of Image Measurement Device According to First Embodiment

Figure 1:
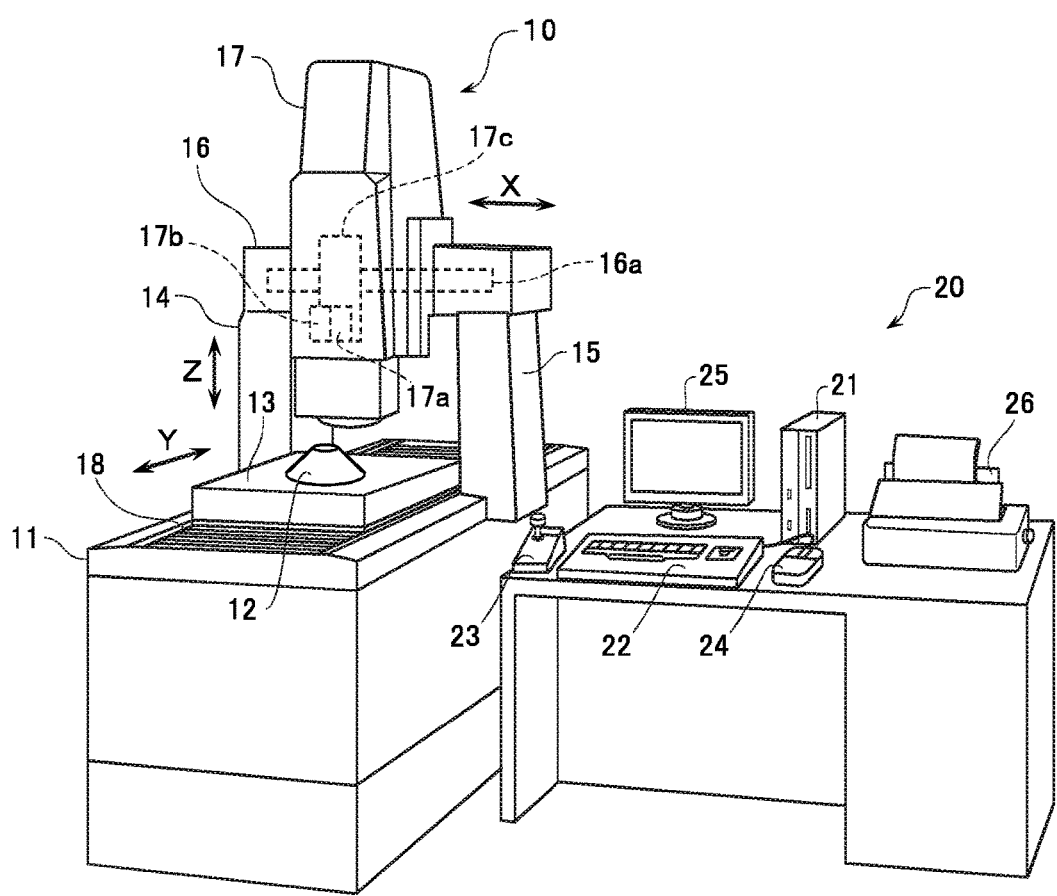
FIG. 1 is a general view of an image measurement device according to a first embodiment of the present invention.

Next, a configuration of an image measurement device according to a first embodiment of the present invention will be described with reference to the drawings. FIG. 1 is a general view of the image measurement device according to the present embodiment.

The image measurement device comprises: an image measuring machine 10 in which cameras 17a and 17b are mounted as an imaging device that images a work 12; and a computer (hereafter, called "PC") 20 which is electrically connected to this image measuring machine 10 and drives/controls the image measuring machine 10 by a program stored internally.

The image measuring machine 10 is configured as follows. That is, a stage 13 for mounting the work 12 (measurement object) is attached onto a pedestal 11, and this stage 13 is driven in a Y axis direction parallel to an upper surface of the stage 13 by a Y axis drive mechanism 18. Support arms 14 and 15 extending upwardly are fixed to a central portion of edges on both sides of the pedestal 11, and an X axis guide 16 is fixed so as to link both upper end portions of these support arms 14 and 15. Supported by this X axis guide 16 is an imaging unit 17 that images the work 12. The imaging unit 17 is configured capable of being driven along the X axis guide 16 in an X axis direction orthogonal to the Y axis direction, parallel to the upper surface of the stage 13, by an X axis drive mechanism 16a. Moreover, the imaging unit 17 includes: a first imaging device 17a having as its measurement visual field a certain imaging range used during a main measurement; and a second imaging device 17b used during a preliminary measurement and capable of imaging an entire measurement range broader than the measurement visual field of the main measurement. These imaging devices 17a and 17b are configured to be switchable between a preliminary measurement time and a main measurement time. These imaging devices 17a and 17b may be configured as one camera by magnification adjustment of an object lens. The imaging unit 17 is configured to be movable in a Z axis direction orthogonal to the upper surface of the stage 13, by a Z axis drive mechanism 17c. As described above, the X axis drive mechanism 16a, the Y axis drive mechanism 18, and the Z axis drive mechanism 17c configure a position control device that drives the imaging unit 17 relatively to the stage 13 in mutually orthogonal X, Y, and Z axis directions.

The image measuring machine 10 according to the present embodiment, while moving the cameras 17a and 17b in the XY directions with respect to the upper surface of the stage 13, performs imaging while scanning in the Z axis direction, and, from measurement position information in the XY directions of the cameras 17a and 17b and contrast information of each minute range of an image obtained at that position, detects a displacement (Z value) in the Z axis direction at each measurement position of the work 12. Note that the displacement in the Z axis direction, besides being detected from such contrast information, can also be detected by a white light interference meter. The white light interference meter guides white light having a broadband spectrum, for example, to the work 12 and a reference surface, causes the respective reflected lights to interfere to acquire a position where a peak value of an interference signal on a pixel basis is observed, and detects the displacement in the Z axis direction of the work 12 based on a peak position on a pixel basis and a position of a reference plate configuring the reference surface.

Figure 2:
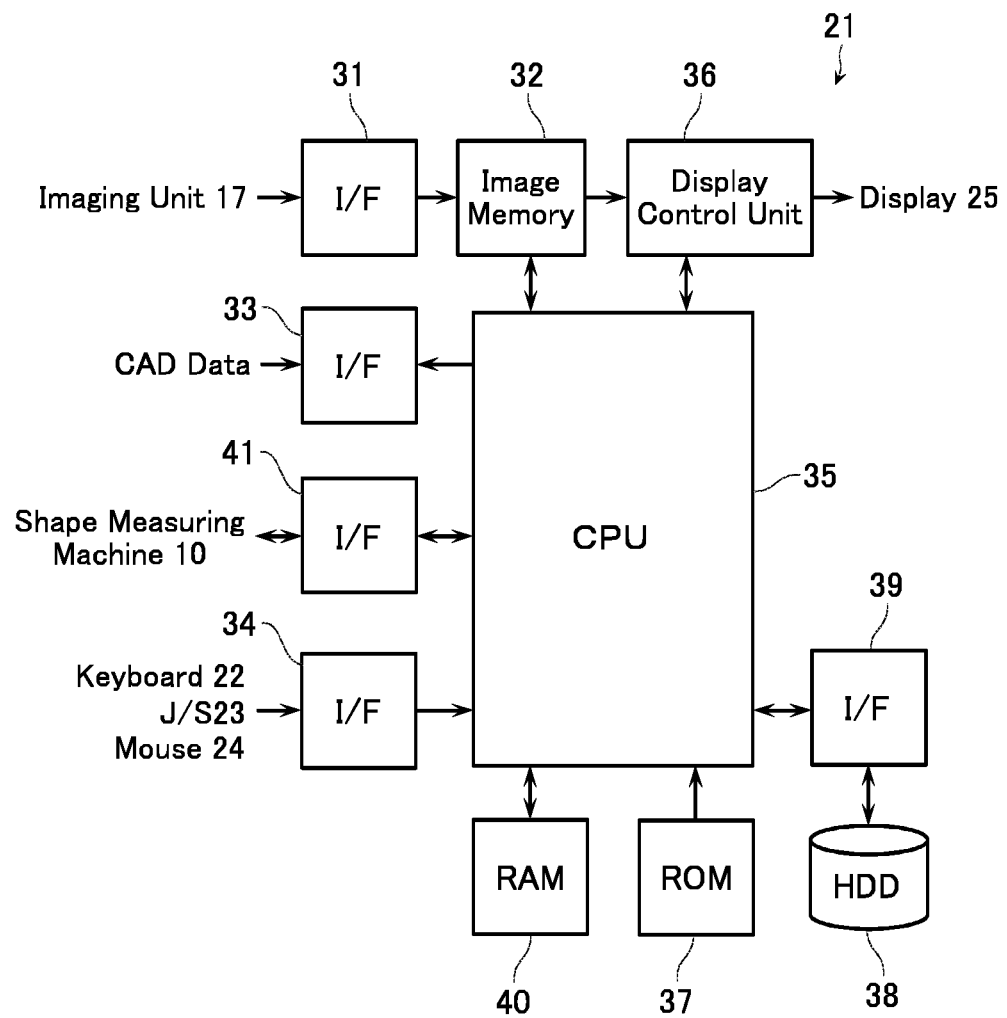
FIG. 2 is a block diagram showing a configuration of the same device.

The computer 20 includes a computer main body 21, a keyboard 22, a joystick box (J/S) 23, a mouse 24, a display 25, and a printer 26. The computer main body 21 is configured as shown in FIG. 2, for example. That is, image information of the work 12 inputted from the imaging unit 17 is stored in an image memory 32 via an interface (I/F) 31.

In addition, CAD data of the work 12 is inputted to a CPU 35 via an I/F 33 and, after having undergone a certain processing in the CPU 35, is stored in the image memory 32. The image information stored in the image memory 32 is displayed on the display 25 via a display control unit 36.

On the other hand, code information and position information inputted from the keyboard 22, the J/S 23, and the mouse 24 are inputted to the CPU 35 via an I/F 34. The CPU 35 executes various kinds of processings in accordance with a macroprogram stored in a ROM 37 and a program stored in a RAM 40 via an I/F 39 from a HDD 38.

The CPU 35 controls the image measuring machine 10 via an I/F 41 in accordance with the program. The HDD 38 is a recording medium that stores various kinds of data. The RAM 40 provides a work region of the various kinds of processings.

Operation of Conventional Image Measurement Device

Figure 6:
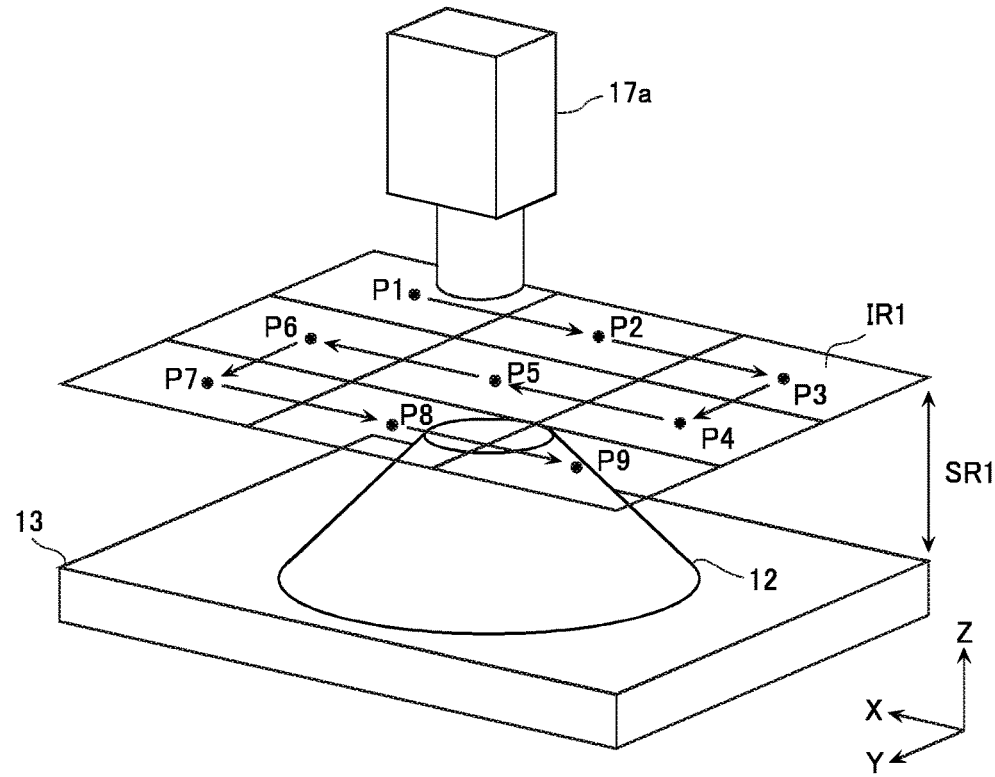
FIG. 6 is a schematic view for explaining operation of a conventional image measurement device.

Next, prior to describing an image measurement method using the image measurement device according to the present embodiment, a conventional image measurement method will be described. FIG. 6 is a schematic view for explaining the conventional image measurement method.

As shown in FIG. 6, in the case of measuring a three-dimensional shape of a measurement range which is broader than an imaging range IR1 of the camera 17a, the camera 17a is moved sequentially in the XY axis directions parallel to the upper surface of the stage 13 in the manner of measurement position P1→P2→ . . . →P9, and at each measurement position P1, P2, . . . , P9, the camera 17a is scanned in the Z axis direction orthogonal to the upper surface of the stage 13 and the displacement (Z value) in the Z axis direction of the work 12 at each measurement position P1, P2, . . . , P9 is detected. More specifically, for example, the Z value of each minute region is found from contrast information of each minute region in the imaging range IR1 of the camera 17a. In the conventional image measurement method, scan ranges SR1 in the Z axis direction at each measurement position P1, P2, . . . , P9 were all identical, hence it was required to set the scan range SR1 so as to include from a lowest position to a highest position of the work 12. Therefore, an entire scan range was long, the scan took time, and it was inefficient.

Operation of Image Measurement Device According to Present Embodiment

Figure 3:
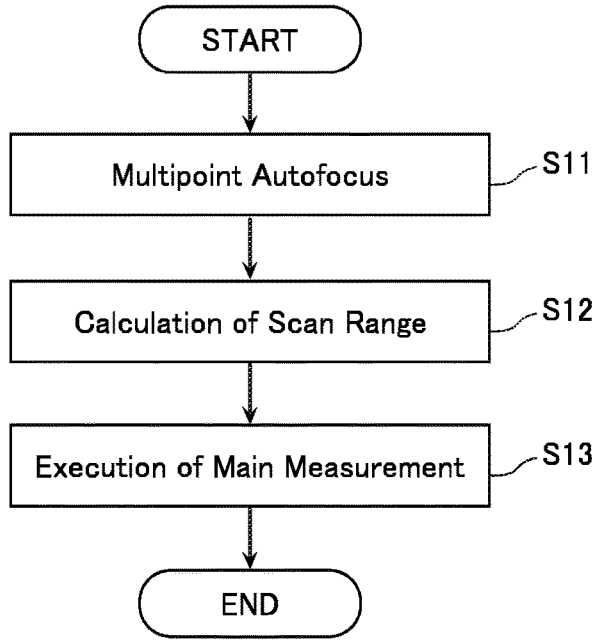
FIG. 3 is a flowchart explaining operation of the same device.

Next, a method of measuring of the image measurement device according to the present embodiment will be described. FIG. 3 is a flowchart for explaining the image measurement method using the image measurement device according to the present embodiment.

Figure 4:
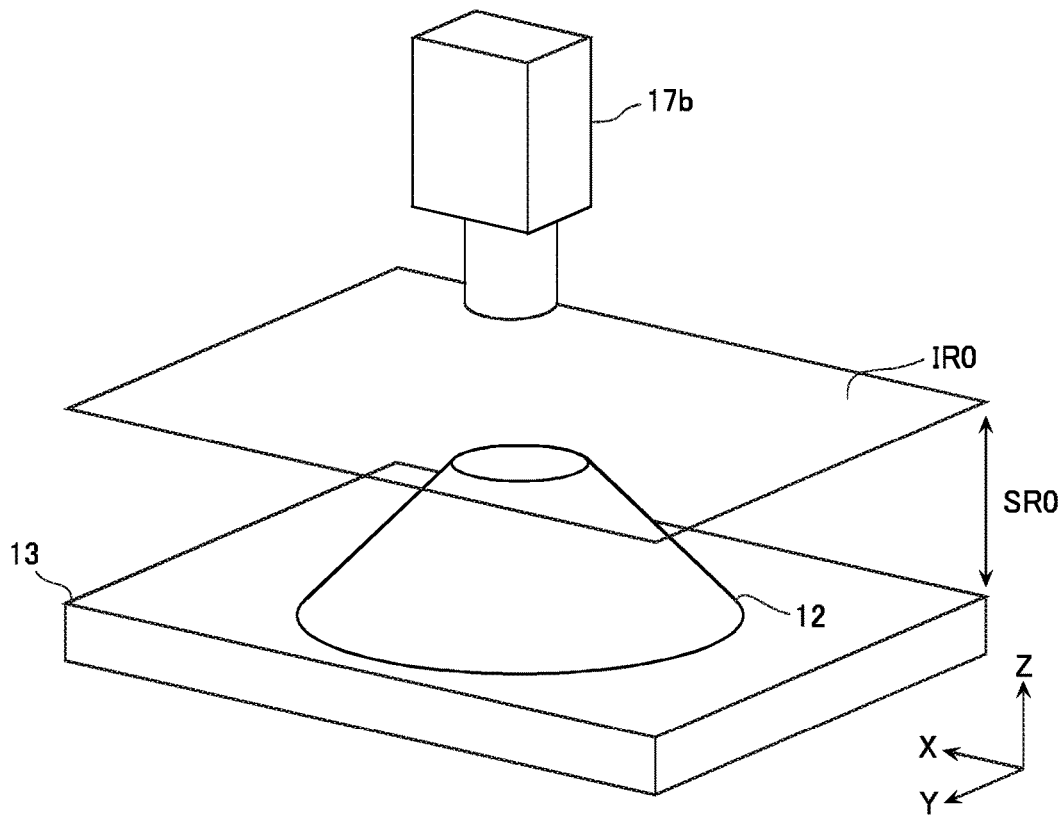
FIG. 4 is a schematic view for explaining operation of the same device.

In step S11, as shown in FIG. 4, an autofocus as the preliminary measurement employing the second camera 17b which has a view field broader than that of the first camera 17a and which is preferably capable of imaging the entire measurement range IR0, is performed as the preliminary measurement. Hereafter, the autofocus performed over a broad range by the preliminary measurement will be called "multipoint autofocus". In multipoint autofocus, two-dimensional images at each Z axis direction positions are acquired as preliminary measurement image information for the measurement range IR0, while scanning the second camera 17b in the Z axis direction in a scan range SR0. Then, the displacement (Z value) in the Z axis direction at each measurement point P1' to P9' (FIG. 5) is detected from the acquired preliminary measurement image information. Now, a range of the preliminary measurement need not necessarily be matched to the entire measurement range IR0, and it is also possible, for example, for it to be set in a range narrower than that, as required.

Moreover, the multipoint autofocus in step S11 need only find an approximate Z value, hence it is also possible for it to be performed with a lower precision compared to the later-mentioned main measurement, such as by setting a frame rate of the second camera 17b lower compared to a frame rate of the first camera 17a, and so on. Therefore, even if the scan range SR0 is set to a similar length to conventionally, a scan of higher than conventional speed is possible.

Figure 5:
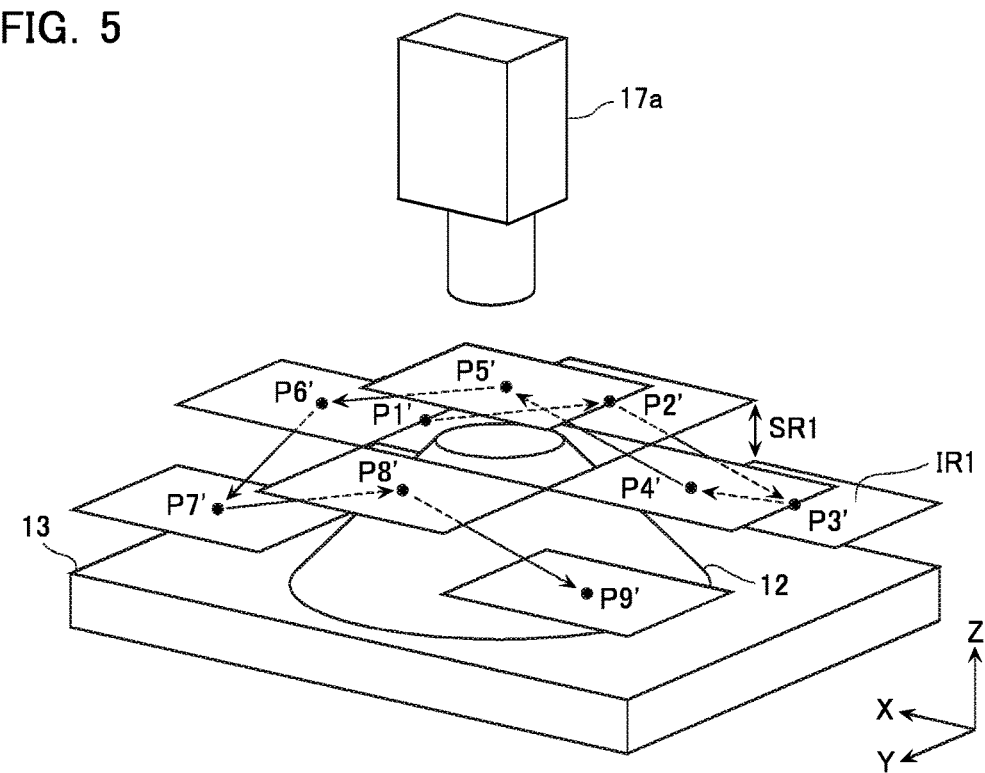
FIG. 5 is a schematic view for explaining operation of the same device.

In step S12, the scan range SR1 (FIG. 5) in the Z axis direction of the first camera 17a for the main measurement is calculated from the Z value of each measurement position P1' to P9' in the preliminary measurement of the measurement range IR0 acquired in step S11. The scan range SR1 of the main measurement can have the Z kalue of each measurement position P1' to P9' set as a center, a start point, or a finish point. For example, as shown in FIG. 5, in the case where the measurement range IR0 is divided into 3×3 imaging ranges IR1 in the XY axis directions and each imaging region IR1 is assumed to be a main measurement range of each measurement position P1' to P9', the scan range SR1 in the Z axis direction at each measurement position P1' to P9' is a respective range having as its start point the Z value at each measurement position P1' to P9' detected in the preliminary measurement. The scan range SR1 at a time of the main measurement is a narrower range than the scan range SR0 at a time of the preliminary measurement, and time required for the entire scan can be proportionately reduced.

In step S13, the main measurement, that is, the autofocus in each imaging range IR1 is performed based on the scan range SR1 calculated in step S12. That is, in step S13, as shown in FIG. 5, the first camera 17a is moved in the XYZ axis directions in the manner of measurement position P1'→P2'→P9', and for each imaging range IR1 of the first camera 17a, a scan of the scan range SR1 in the Z axis direction is performed to acquire a two-dimensional image at each Z position and detect the displacement in the Z axis direction of each portion.

This main measurement is performed with higher precision compared to the multipoint autofocus of step S11. However, the scan range SR1 during the main measurement can be set extremely narrowly compared to the scan range SR0 since a rough Z value of the work 12 is understood, and more efficient measurement can be performed compared to in the conventional technology.

Note that the present invention is not limited to the above-mentioned embodiment. For example, in the above-described embodiment, it is configured such that the Z value is found by a focusing position of the image, but the present invention may of course be applied also to another image measurement device capable of detecting Z axis displacement of a work in a contactless manner.

What is claimed is:

1. An image measurement device, comprising:
   a stage on which a measurement object is mounted;
   an imaging device provided capable of relative movement with respect to the stage, the imaging device imaging the measurement object for a certain imaging range which is narrower than a measurement range and outputting image information;
   a position control device that moves the imaging device to a plurality of measurement positions in the measurement range and scans in a scanning direction perpendicular to the stage at each measurement position; and
   an arithmetic processing device that calculates a displacement of the measurement object in the scanning direction at each measurement position based on image information of the certain imaging range of each measurement position obtained by scanning of the imaging device,
   the imaging device being capable of imaging a preliminary measurement range which is broader than the certain imaging range, wherein the imaging device switches a first imaging system and a second imaging system that have different imaging visual fields, between a time of the preliminary measurement and a time of a main measurement, and images the imaging range and the preliminary measurement range, and
   the arithmetic processing device:
   prior to the main measurement which measures the displacement of the measurement object in the scanning direction at each measurement position, making a preliminary measurement that measures the displacement of the measurement object in the scanning direction at each measurement position from image information obtained by the imaging device scanning while imaging the preliminary measurement range; and
   setting a scanning range of the imaging device at each measurement position during the main measurement based on a result of this preliminary measurement.

2. The image measurement device according to claim 1, wherein
   the preliminary measurement range is equal to the measurement range.

3. The image measurement device according to claim 1, wherein
   the scanning range at each measurement position during the main measurement is narrower than the scanning range in the scanning direction during the preliminary measurement.

4. The image measurement device according to claim 2, wherein
   the scanning range at each measurement position during the main measurement is narrower than the scanning range in the scanning direction during the preliminary measurement.

5. The image measurement device according to claim 1, wherein
   the preliminary measurement is performed with a lower precision compared to the main measurement.

6. The image measurement device according to claim 1, wherein
   scan ranges of the main measurement have the displacements of the measurement object in the scanning direction measured in the preliminary measurement as a center, a start point, or a finish point.

7. A controlling method of an image measurement device, the image measurement device including:
   a stage on which a measurement object is mounted;
   an imaging device provided capable of relative movement with respect to the stage, the imaging device imaging the measurement object for a certain imaging range which is narrower than a measurement range and outputting image information;
   a position control device that moves the imaging device to a plurality of measurement positions in the measurement range and scans in a scanning direction perpendicular to the stage at each measurement position; and
   an arithmetic processing device that calculates a displacement of the measurement object in the scanning direction at each measurement position based on image information of the certain imaging range of each measurement position obtained by scanning of the imaging device, and
   the imaging device being capable of imaging a preliminary measurement range which is broader than the certain imaging range,
   the method comprising:
   the arithmetic processing device making, prior to a main measurement that measures the displacement of the measurement object in the scanning direction at each measurement position, a preliminary measurement that measures the displacement of the measurement object in the scanning direction at each measurement position from image information obtained by the imaging device scanning while imaging the preliminary measurement range;
   the arithmetic processing device setting a scanning range of the imaging device at each measurement position during the main measurement based on a result of this preliminary measurement; and
   switching, via the imaging device, a first imaging system and a second imaging system that have different imaging visual fields, between a time of the preliminary measurement and a time of the main measurement, such that the imaging device images the imaging range and the preliminary measurement range.

8. The controlling method of the image measurement device according to claim 7, wherein
   the preliminary measurement range is equal to the measurement range.

9. The controlling method of the image measurement device according to claim 7, wherein the scanning range at each measurement position during the main measurement is narrower than the scanning range in the scanning direction during the preliminary measurement.

10. The controlling method of the image measurement device according to claim 8, wherein
the scanning range at each measurement position during the main measurement is narrower than the scanning range in the scanning direction during the preliminary measurement.

11. The controlling method of the image measurement device according to claim 7, wherein
the preliminary measurement is performed with a lower precision compared to the main measurement.

12. The controlling method of the image measurement device according to claim 7, wherein
scan ranges of the main measurement have the displacements of the measurement object in the scanning direction measured in the preliminary measurement as a center, a start point, or a finish point.

\* \* \* \* \*